United States Patent
Uchida et al.

(10) Patent No.: US 10,661,627 B2
(45) Date of Patent: May 26, 2020

(54) BRACKET

(71) Applicant: TOYOTA JIDOSHA KABUSHIKI KAISHA, Toyota-shi, Aichi-ken (JP)

(72) Inventors: Satoshi Uchida, Toyota (JP); Takaomi Kondo, Toyota (JP); Masaki Shirashige, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 185 days.

(21) Appl. No.: 15/908,118

(22) Filed: Feb. 28, 2018

(65) Prior Publication Data
US 2018/0186211 A1 Jul. 5, 2018

Related U.S. Application Data (62) Division of application No. 15/051,159, filed on Feb. 23, 2016.

(30) Foreign Application Priority Data

Apr. 16, 2015 (JP) .................................. 2015-084203

(51) Int. Cl.
*B60G 21/055* (2006.01)

(52) U.S. Cl.
CPC .... *B60G 21/0551* (2013.01); *B60G 2202/135* (2013.01); *B60G 2204/1222* (2013.01); *B60G 2204/41* (2013.01)

(58) Field of Classification Search
CPC .......... B60G 21/0551; B60G 2202/135; B60G 2204/1222; B60G 2204/41; B60G 2206/427; B60G 2204/4307; B60G 2204/41043; B60G 21/055; B60G 2204/4104; F16L 3/1207; F16F 1/16; F16F 1/3835; F16F 1/373; F16F 1/3732
USPC ... 248/313, 50, 55, 505, 503, 65, 74.1, 74.3; 280/124.07, 124.152; 267/188–189
See application file for complete search history.

(56) References Cited

U.S. PATENT DOCUMENTS

| | | | |
|---|---|---|---|
| 1,455,609 | A | 5/1923 | Hannaford |
| 2,310,434 | A | 2/1943 | Hyman |
| 3,266,761 | A | 8/1966 | Walton et al. |
| 5,118,070 | A | 6/1992 | Reid |

(Continued)

FOREIGN PATENT DOCUMENTS

| JP | 2001-271881 A | 10/2001 |
|---|---|---|
| JP | 2008-207708 A | 9/2008 |

(Continued)

OTHER PUBLICATIONS

May 4, 2017 Office Action Issued in U.S. Appl. No. 15/051,159.
Oct. 26, 2017 Office Action Issued in U.S. Appl. No. 15/051,159.

*Primary Examiner* — Ingrid M Weinhold
(74) *Attorney, Agent, or Firm* — Oliff PLC (57) ABSTRACT

A bracket includes: a recessed portion capable of accommodating a bushing; and a mount portion to be mounted on a vehicle-body-side component, on which a stabilizer bar is to be mounted via the bushing. The recessed portion has a pair of opposed portions opposed to each other. The pair of opposed portions have an intermediate portion and a portion nearer to an opening than the intermediate portion, and a distance between the pair of opposed portions is less at the portion nearer to the opening than at the intermediate portion.

11 Claims, 5 Drawing Sheets

(56) References Cited

U.S. PATENT DOCUMENTS

| | | | |
|---|---|---|---|
| D342,011 S | 12/1993 | Maguire | |
| 5,290,018 A | 3/1994 | Watanabe et al. | |
| 5,297,890 A | 3/1994 | Commins | |
| 5,350,267 A | 9/1994 | Mangone, Jr. | |
| 5,549,283 A * | 8/1996 | Bellamy | F16F 1/387 267/140.12 |
| 5,961,103 A * | 10/1999 | Reh | F16F 13/14 267/140.12 |
| D422,204 S | 4/2000 | Holloway et al. | |
| 6,186,452 B1 | 2/2001 | Zearbaugh et al. | |
| 6,607,172 B1 | 8/2003 | Green et al. | |
| 6,845,994 B2 | 1/2005 | Cai et al. | |
| 6,889,988 B2 | 5/2005 | Cai et al. | |
| 6,893,034 B2 | 5/2005 | Fader | |
| 6,971,640 B2 | 12/2005 | Joseph | |
| 7,017,865 B2 | 3/2006 | Zearbaugh | |
| 7,534,048 B2 * | 5/2009 | Holman | F16C 23/06 384/535 |
| 7,744,042 B2 | 6/2010 | Heath | |
| D647,784 S | 11/2011 | McNamara | |
| 8,360,450 B2 | 1/2013 | Kuroda | |
| 8,376,289 B2 | 2/2013 | Heath | |
| 8,505,940 B1 | 8/2013 | Hufnagle et al. | |
| 8,613,460 B2 | 12/2013 | Suwa et al. | |
| D742,213 S | 11/2015 | Sasanecki | |
| 2002/0121733 A1 | 9/2002 | Lewis et al. | |
| 2003/0111818 A1 | 6/2003 | Carlstedt et al. | |
| 2003/0197343 A1 | 10/2003 | Cai et al. | |
| 2004/0075235 A1 | 4/2004 | Cai et al. | |
| 2005/0029723 A1 | 2/2005 | Lewis et al. | |
| 2006/0091595 A1 | 5/2006 | Hayashi et al. | |
| 2007/0158506 A1 | 7/2007 | Trotter et al. | |
| 2008/0067727 A1 | 3/2008 | Schwarz et al. | |
| 2008/0106056 A1 | 5/2008 | Kleckner | |
| 2010/0244395 A1 | 9/2010 | Sugiura et al. | |
| 2011/0170814 A1 | 7/2011 | Nakamura et al. | |
| 2011/0175269 A1 | 7/2011 | Harada et al. | |
| 2011/0186696 A1 | 8/2011 | Hsieh et al. | |
| 2011/0291377 A1 | 12/2011 | Kato et al. | |
| 2013/0043368 A1 | 2/2013 | Hill | |
| 2015/0239319 A1 | 8/2015 | Kuroda et al. | |
| 2016/0176260 A1 | 6/2016 | Kuroda | |

FOREIGN PATENT DOCUMENTS

| | | |
|---|---|---|
| JP | 2013-060196 A | 4/2013 |
| JP | 2014-084061 A | 5/2014 |
| JP | 2014-210534 A | 11/2014 |
| JP | 5638656 B2 | 12/2014 |

\* cited by examiner

Lbv > Lbh
Lbh > Lh
Lbv > H

BRACKET

CROSS REFERENCE TO RELATED APPLICATION

This is a Continuation of U.S. patent application Ser. No. 15/051,159, filed Feb. 23, 2016, pending, which claims priority from Japanese Patent Application No. 2015-084203, which was filed on Apr. 16, 2015, the disclosure of which is herein incorporated by reference in its entirety.

BACKGROUND

Technical Field

The following disclosure relates to a bracket used for mounting of a stabilizer bar on a vehicle body via a bushing.

Description of the Related Art

Patent Documents 1-4 disclose stabilizer-bar mounting devices (hereinafter simply referred to as "bar mounting devices") including: a bushing for holding a stabilizer bar; and a bracket used for mounting of the bushing on a vehicle-body-side component.

Patent Document 1 (Japanese Patent Application Publication No. 2014-210534) discloses a bar mounting device including (i) a bushing (see FIGS. 5 and 7) having a protruding portions formed on a pair of side surfaces of the bushing and (ii) a bracket having a flange portion and a recessed portion for accommodating the bushing. In this bar mounting device, the bushing has interferences in an up and down direction and a front and rear direction of a vehicle. Thus, surface pressures uniformly act on the stabilizer bar. Patent Document 1 also discloses a bar mounting device that includes a bracket (see FIG. 9) having a gradually-broaden guide portion formed in an opening of a recessed portion of the bushing. In this bar mounting device, the bushing can be easily inserted into the recessed portion in mounting.

Patent Document 2 (Japanese Patent Application Publication No. 2014-084061) discloses a bar mounting device including a bushing having a through hole in which a stabilizer bar is to be inserted, and the through hole has a lower small-diameter portion and an upper large-diameter portion. Since the lower portion of the through hole has a small diameter, it is possible to well reduce lowering of surface pressures acting on a lower portion of the stabilizer bar, leading to uniform surface pressures. Patent Document 2 also discloses a bar mounting device including a rigid component (see FIG. 11) provided between the bushing and a vehicle body. This rigid component suppresses a downward flow of an elastic material of the bushing, making it possible to reduce lowering of the surface pressures acting on the lower portion of the stabilizer bar.

Patent Document 3 (Japanese Patent Application Publication No. 2013-060196) discloses a bar mounting device including: a bushing; flange portions respectively provided at opposite end portions of the bushing in its axial direction; and a bracket (see FIG. 9) to be fitted between these flange portions. This construction reduces relative movement of the bushing and the bracket in the axial direction.

Patent Document 4 (Japanese Patent Application Publication No. 2008-207708) discloses a bar mounting device including a bushing that includes: a protruding portion provided at an intermediate portion of the bushing in its axial direction; and a stopper provided on one end portion of the bushing. A bracket is mounted in a state in which the bracket is held in contact with the stopper and fitted on the protruding portion of the bushing.

SUMMARY

Accordingly, an aspect of the disclosure relates to a bracket capable of achieving uniform surface pressures acting on a stabilizer bar.

In one aspect of the disclosure, a bracket includes a narrowed portion provided at a position nearer to an opening than an intermediate portion of a recessed portion for accommodating a bushing.

Surface pressures are applied by the narrowed portion via the bushing to a portion of a stabilizer bar near a vehicle-body-side component. As a result, uniform surface pressures act on the stabilizer bar.

Figure 9:
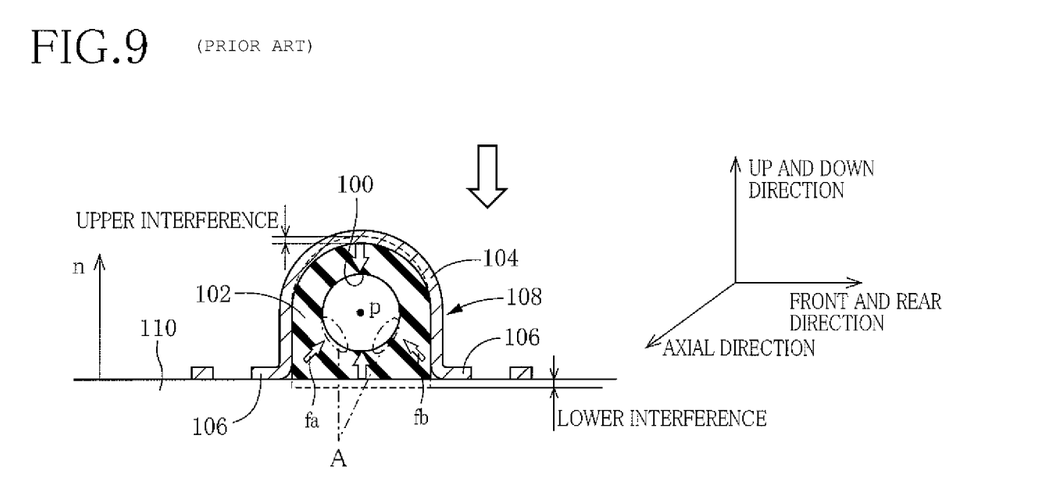
FIG. 9 is a cross-sectional view of a conventional bar mounting device.

FIG. 9 in the present application illustrates one example of a conventional bar mounting device. The bar mounting device includes (i) a cylindrical bushing 102 having a generally semicircular shape in cross section and having a central portion formed with a through hole 100 and (ii) a bracket 108 having (a) a recessed portion 104 for accommodating the bushing 102 and (b) a pair of flange portions 106 respectively provided on opposite sides of the recessed portion 104. The stabilizer bar is mounted on a vehicle-body-side component 110 by securing the pair of flange portions 106 to vehicle-body-side component 110 in a state in which the stabilizer bar is inserted in the through hole 100 of the bushing 102, and the bushing 102 is accommodated in the recessed portion 104 of the bracket 108. In FIG. 9, a direction of a normal linen to a mounting surface of the vehicle-body-side component 110 coincides with an up and down direction of a vehicle. A direction parallel with an axis p of the stabilizer bar coincides with a widthwise direction of the vehicle. A direction perpendicular to the up and down direction and the widthwise direction coincides with a front and rear direction or a longitudinal direction of the vehicle.

In this conventional bar mounting device, the bushing 102 has upper and lower interferences. Thus, a large surface pressure is applied to the stabilizer bar in the up and down direction in the state in which the stabilizer bar is mounted on the vehicle-body-side component 110. However, the bushing 102 is compressed at its upper portion by the recessed portion 104 of the bracket 108 but is compressed at its lower portion by the mounting surface (i.e., a flat surface) of the vehicle-body-side component 110. Thus, a surface pressure applied to an upper portion of the stabilizer bar differs from a surface pressure applied to a lower portion of the stabilizer bar. For example, small surface pressures fa, fb are respectively applied to portions A of the lower portion of the stabilizer bar which are enclosed by one-dot chain lines in FIG. 9. Accordingly, in the case where the stabilizer bar is bonded to the bushing 102, adhesiveness of the stabilizer bar and the bushing 102 lowers. In the case where the stabilizer bar and the bushing 102 are not bonded to each other, the through hole 100 is more easily opened.

In contrast, when the bracket according to the present disclosure is used to mount the stabilizer bar on the vehicle-body-side component 110 via the bushing in a state similar to the state illustrated in FIG. 9, for example, surface pressures are applied by the narrowed portion of the bracket via the bushing to the portions A of the lower portion of the stabilizer bar (which corresponds to a portion of the stabilizer bar near the vehicle-body-side component 110). As a result, surface pressures are applied to the stabilizer bar more uniformly than in the case of the conventional bar mounting device. In the case where the stabilizer bar is bonded to the bushing, lowering of adhesiveness can be reduced, and in the case where the stabilizer bar is not bonded to the bushing, opening of the through hole can be prevented.

CLAIMABLE INVENTIONS

There will be described inventions recognized to be claimable in the present invention and features of the invention.

(1) A bracket, comprising:

a recessed portion capable of accommodating a bushing; and a mount portion to be mounted on a vehicle-body-side component, on which a stabilizer bar is to be mounted via the bushing, wherein the recessed portion comprises a pair of opposed portions opposed to each other, and wherein the pair of opposed portions comprise an intermediate portion and a portion nearer to an opening than the intermediate portion, and a distance between the pair of opposed portions is less at the portion nearer to the opening than at the intermediate portion.

The portion of the pair of opposed portions which is nearer to the opening than the intermediate portion has a portion at which the distance between the pair of opposed portions is less than that at the intermediate portion. A narrowed portion is constituted by at least a portion of the portion at which the distance between the pair of opposed portions is less than that at the intermediate portion.

(2) The bracket according to the above form (1), wherein each of the pair of opposed portions is shaped so as to be bent inwardly between the intermediate portion and an open end of the recessed portion.

(3) The bracket according to the above form (2), wherein the pair of opposed portions respectively comprise a pair of inwardly inclined portions at the portion nearer to the opening than the intermediate portion, and wherein a distance between the pair of inwardly inclined portions decreases with increase in distance thereof from the intermediate portion.

The distance between the inwardly inclined portions may decrease in a curved fashion and may decrease linearly.

(4) The bracket according to any one of the above forms (1) through (3), wherein the pair of opposed portions respectively comprise a pair of outwardly inclined portions, and a distance between the pair of outwardly inclined portions increases with decrease in distance thereof to an open end at the portion nearer to the opening than the intermediate portion.

The pair of outwardly inclined portions define the shape of the opening of the recessed portion to a gradually broaden shape, in other words, a tapered shape. This shape allows the bushing to be easily inserted into the recessed portion of the bracket. A pair of inwardly protruding portions each protruding to the most inward position are formed between the pair of inwardly inclined portions and the pair of outwardly inclined portions. The narrowed portion is constituted by the pair of inwardly protruding portions and at least a portion of the inwardly inclined portions (which includes a portion of the inwardly inclined portions near the inwardly protruding portions), for example.

In the state in which the stabilizer bar is mounted on the vehicle-body-side component by the present bracket via the bushing, the narrowed portion is preferably provided at a position nearer to the vehicle-body-side component than a line of intersection of each of the pair of opposed portions and a plane containing the diameter of the stabilizer bar. The narrowed portion is more preferably provided near a line of intersection of each of the pair of opposed portions and a tangent plane to the stabilizer bar near the vehicle-body-side component (in other words, the narrowed portion is more preferably provided within a set range containing the line of intersection of each of the pair of opposed portions and the tangent plane). Alternatively, the narrowed portion is more preferably provided at a position nearer to the vehicle-body-side component than the line of intersection.

(5) The bracket according to the above form (4), wherein the pair of outwardly inclined portions respectively comprise a pair of straight portions, and a distance between the pair of straight portions continuously increases with decrease in distance thereof to the open end.

(6) The bracket according to any one of the above forms (1) through (5), wherein the pair of opposed portions respectively comprise a pair of flat plate portions provided at the intermediate portion, and a distance between the pair of flat plate portions is constant.

The bushing can be well compressed by the flat plate portions.

(7) A stabilizer-bar mounting device, comprising:

the bracket according to any one of the above forms (1) through (6); and a bushing that holds the stabilizer bar.

(8) The bar mounting device according to the above form (7), wherein the bushing is a cylindrical member comprising a through hole extending in an axial direction of the bushing, and wherein the bushing comprises: a pair of side surfaces opposed to each other; and a pair of recessed portions formed near a line of intersection of each of the pair of side surfaces and a tangent plane to the through hole.

The pair of recessed portions opposed to the narrowed portion of the bracket have a cross-sectional shape which is generally formed by cutting out portions of the pair of side surfaces of the bushing. The recessed portion is preferably provided at a position nearer to a vehicle-body-side component than a line of intersection of each of the pair of side surfaces and a plane containing the diameter of the through hole. Also, the recessed portion is more preferably provided near the line of intersection of each of the pair of side surfaces and the tangent plane to the through hole (in other words, within a set range containing the line of intersection) or provided at a position farther from the through hole than the line of intersection.

(9) A bushing, as a cylindrical member, comprising:

a pair of side surfaces opposed to each other;

a pair of recessed portions; and a through hole extending in an axial direction of the bushing, wherein the pair of recessed portions are formed within a set range containing a line of intersection of each of the pair of side surfaces and a tangent plane to the through hole.

The present bushing is suitable for use with the bracket according to any one of the forms (1) through (6).

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Figure 1:
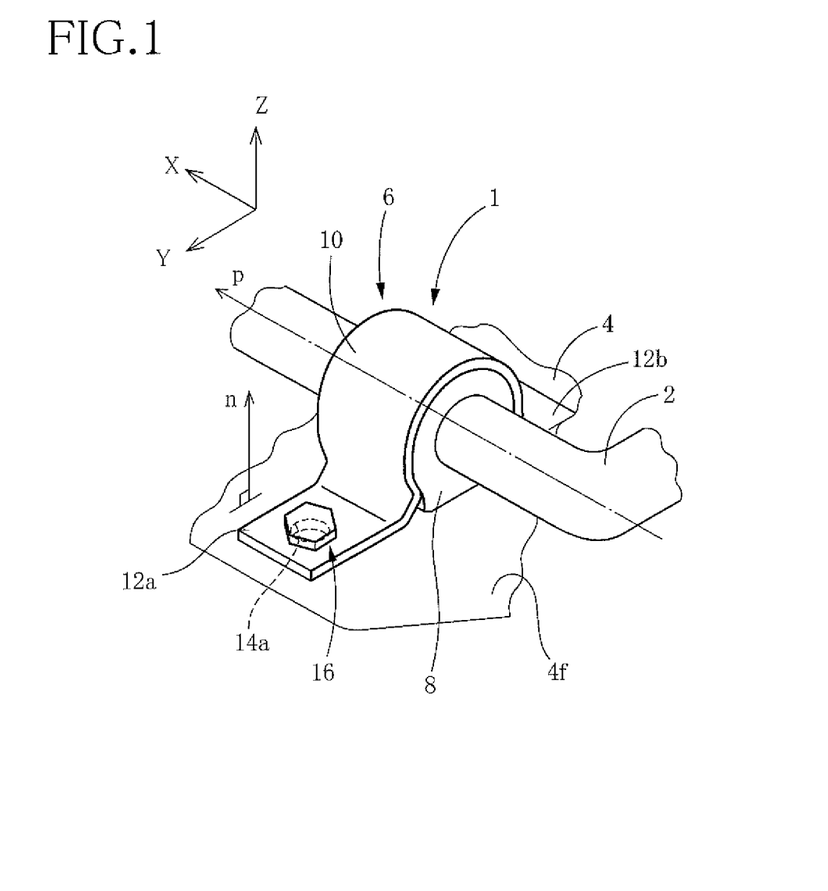
FIG. 1 is a perspective view illustrating a situation in which a stabilizer bar is mounted on a vehicle body via a bushing by a bar mounting device including a bracket according to a first embodiment.

Hereinafter, there will be described a stabilizer-bar mounting device by reference to the drawings. As illustrated in FIG. 1, the stabilizer-bar mounting device (hereinafter simply referred to as "bar mounting device") 1 is used for mounting a stabilizer bar 2 onto a vehicle-body-side component 4, e.g., a suspension member, on a torsion bar. The bar mounting device 1 includes a bracket 6 according to one embodiment, and a bushing 8. The bracket 6 includes a recessed portion 10 and a pair of flange portions 12a, 12b which are formed on opposite sides of the recessed portion 10 as mount portions. For example, the bracket 6 may have a cross-sectional shape which is generally formed by bending a metal plate. The flange portions 12a, 12b respectively have mounting holes 14a, 14b and are mounted on a vehicle-body-side component 4 by a fastening device 16 which may include bolts and nuts, for example.

In FIG. 1, a direction parallel with an axis p of the stabilizer bar 2 is defined as an X direction (hereinafter may be referred to as "axial direction"). A direction parallel with a normal line n to a mounting surface 4f of the vehicle-body-side component 4 is defined as a Z direction. A direction perpendicular to the X direction and the Z direction is defined as "Y direction". The X direction coincides with a widthwise direction of a vehicle, but each of the Y direction and the Z direction is determined depending upon a direction of the normal line n to the mounting surface 4f of the vehicle-body-side component 4. In the present embodiment, the stabilizer bar 2 is mounted by the bar mounting device 1 in a state in which the Y direction coincides with a front and rear direction or a longitudinal direction of the vehicle, and the Z direction coincides with an up and down direction.

First Embodiment

Figure 2:
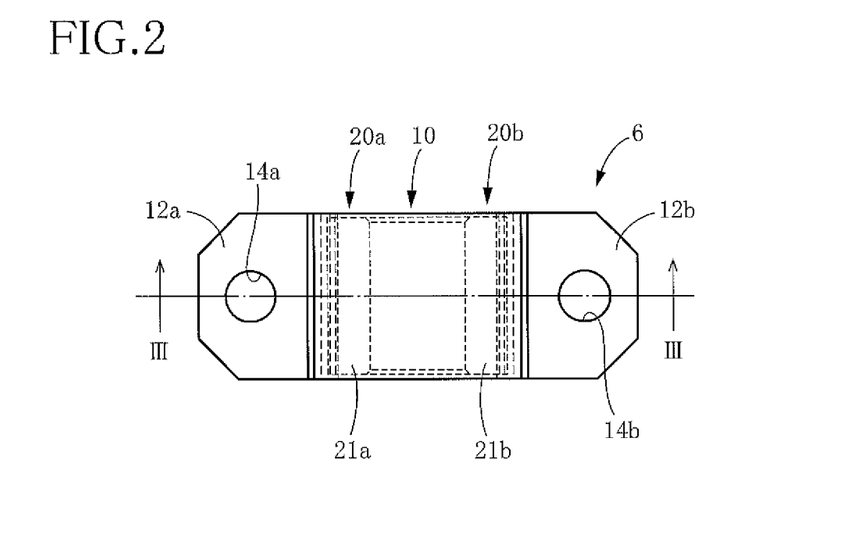
FIG. 2 is a plan view of the bracket.
Figure 3:
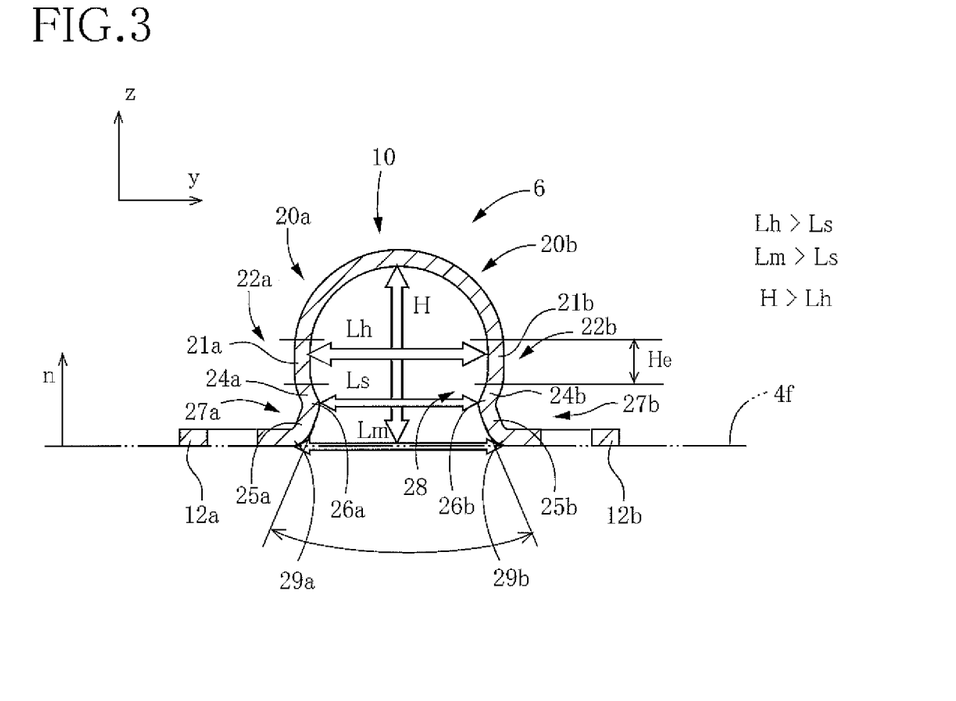
FIG. 3 is a cross-sectional of the bracket (FIG. 3 is a cross-sectional view taken along line III-III in FIG. 2)

As illustrated in FIG. 3, the bracket 6 according to a first embodiment has a generally "Ω" shape in cross section. As illustrated in FIGS. 2 and 3, the recessed portion 10 includes a pair of opposed portions 20a, 20b which are opposed to each other. A distance between the pair of opposed portions 20a, 20b is increased in a curved fashion from the top of the bracket 6 toward the flange portions 12a, 12b, then kept constant, then decreased, and finally increased.

Portions of the pair of opposed portions 20a, 20b with the constant distance correspond to flat plate portions 21a, 21b. Portions of the pair of opposed portions 20a, 20b which include the flat plate portions 21a, 21b constitute intermediate portions 22a, 22b, for example. The flat plate portions 21a, 21b have a size, e.g., a length He in FIG. 3, capable of compressing the bushing 8 well as will be described below.

Portions of the pair of opposed portions 20a, 20b with the decreasing distance correspond to a pair of inwardly inclined portions 24a, 24b. Portions of the pair of opposed portions 20a, 20b with the increasing distance correspond to a pair of outwardly inclined portions 25a, 25b. A pair of inwardly protruding portions 26a, 26b are formed between the pair of inwardly inclined portions 24a, 24b and the pair of outwardly inclined portions 25a, 25b. The outwardly inclined portions 25a, 25b are straight portions, and a distance therebetween changes continuously.

In the present embodiment, "portions 27a, 27b nearer to an opening than the intermediate portions" are constituted by the pair of inwardly inclined portions 24a, 24b, the pair of inwardly protruding portions 26a, 26b, and the pair of outwardly inclined portions 25a, 25b, for example. The pair of inwardly inclined portions 24a, 24b and the pair of inwardly protruding portions 26a, 26b correspond to "portions with a distance therebetween which is less than the distance between the intermediate portions". Also, "portions with a distance therebetween which is less than that between the intermediate portions" correspond to narrowed portions 28.

As illustrated in FIG. 3, a distance Ls between the pair of inwardly protruding portions 26a, 26b is less than a distance Lh between the pair of flat plate portions 21a, 21b (Ls<Lh). The distance Ls between the pair of inwardly protruding portions 26a, 26b may be hereinafter referred to as "distance Ls between the narrowed portions". The distance Lh between the pair of flat plate portions 21a, 21b may be hereinafter referred to as "distance Lh between the flat plate portions". The distance between the pair of outwardly inclined portions 25a, 25b is greatest at connectors 29a, 29b each connecting the recessed portion 10 and a corresponding one of the flange portions 12a, 12b to each other (noted that the connectors 29a, 29b may be referred to as "open ends of the recessed portion 10"). The distance Lm between the open ends 29a, 29b is greater than the distance Ls between the narrowed portions (Lm>Ls). The distance Lm between the open ends 29a, 29b may be greater or less than the distance Lh between the intermediate portions 22a, 22b. It is noted that the height H of the bracket 6 in the up and down direction is greater than the distance Lh between the flat plate portions (H>Lh) in order to make the volume of the bushing 8 larger in the up and down direction than in the front and rear direction.

Figure 4:
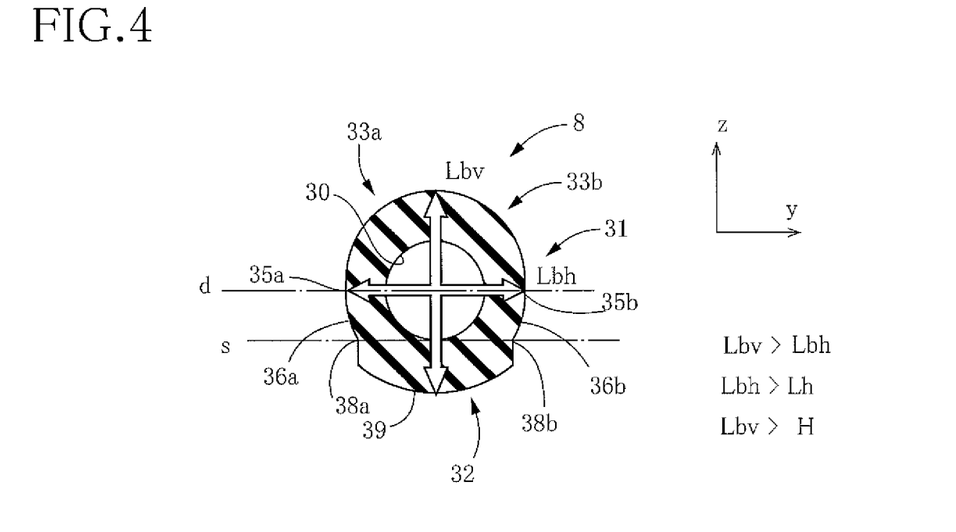
FIG. 4 is a cross-sectional view of the bushing of the bar mounting device.

The bushing 8 is a cylindrical member formed of an elastic material such as rubber. As illustrated in FIG. 4, the bushing 8 has a through hole 30 in which the stabilizer bar 2 is to be inserted. The bushing 8 has a cross-sectional shape which is generally formed by cutting out a portion of an oval shape. In other words, the bushing 8 includes a wide portion 31 and a narrow portion 32.

The bushing 8 has a pair of side surfaces 33a, 33b which are opposed to each other. Each of the pair of side surfaces 33a, 33b in the wide portion 31 is curved so as to protrude outward. The bushing 8 has intermediate portions 35a, 35b which respectively protrude to opposite outermost positions in the Y direction. The bushing 8 has the greatest width at the intermediate portions 35a, 35b. The bushing 8 further has width decreasing portions 36a, 36b between the wide portion 31 and the narrow portion 32. The distance or width between the pair of side surfaces 33a, 33b gradually decreases at the width decreasing portions 36a, 36b. The bushing 8 further has recessed portions 38a, 38b each constituted by, e.g., a portion of the bushing 8 which contains a line of intersection of the narrow portion 32 and a corresponding one of the width decreasing portions 36a, 36b. As illustrated in FIG. 4, each of the recessed portions 38a, 38b is provided near a line of intersection of a tangent plane s to the through hole 30 and a corresponding one of the pair of side surfaces 33a, 33b.

Each of the recessed portions 38a, 38b may be provided between (i) a line of intersection of a corresponding one of the pair of side surfaces 33a, 33b and a plane d containing the diameter of the through hole 30 and (ii) a line of intersection of the tangent plane s and the corresponding one of the pair of side surfaces 33a, 33b. Each of the recessed portions 38a, 38b may also be provided near the line of intersection of the tangent plane s and the corresponding one of the pair of side surfaces 33a, 33b (that is, each of the recessed portions 38a, 38b may be provided within a set range determined by the line of intersection) and may be provided at a position located farther from the through hole 30 than the line of intersection of the tangent plane s and the corresponding one of the pair of side surfaces 33a, 33b, for example. Preferably, each of the recessed portions 38a, 38b is provided within a set range containing the line of intersection of the tangent plane s and the corresponding one of the pair of side surfaces 33a, 33b. It is noted that a bottom surface 39 of the narrow portion 32 is curved such that a central portion of the bottom surface 39 protrudes outward.

Figure 6:
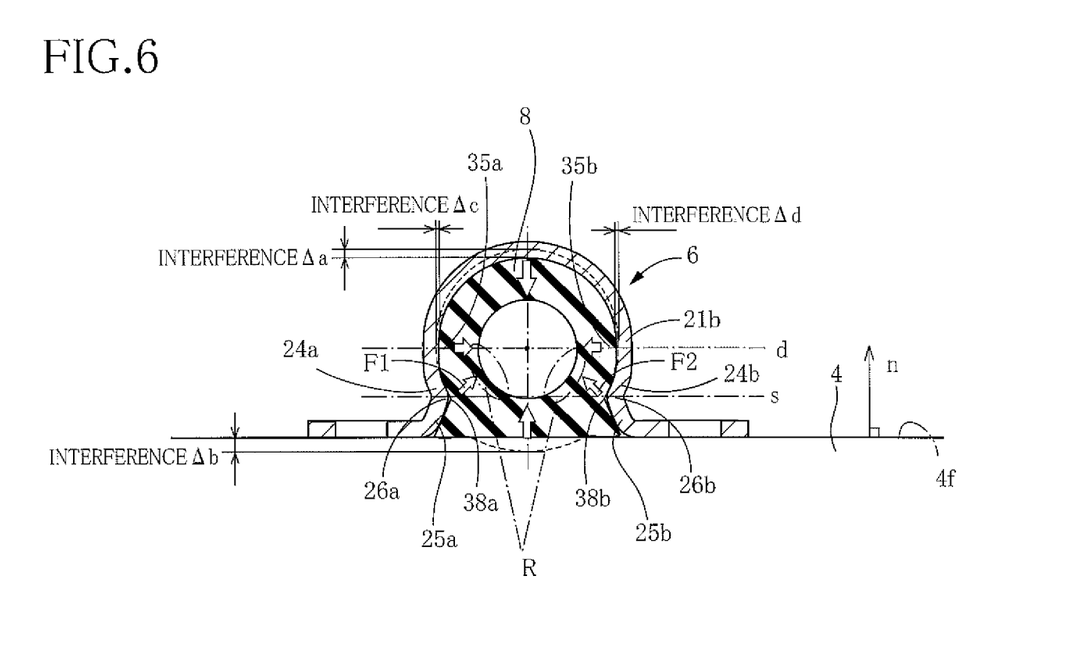
FIG. 6 is a cross-sectional view of the bar mounting device.

As illustrated in FIG. 6, the bushing 8 is accommodated in the recessed portion 10 of the bracket 6 in a state in which a direction of a major axis of the bushing 8 coincides with the up and down direction, and a widthwise direction of the bushing 8 (i.e., a direction of a minor axis of the bushing 8) coincides with the front and rear direction. Since a length Lbv of the bushing 8 in its major axis direction is greater than the height H of the bracket 6 (Lbv>H), the bushing 8 has interferences Δa, Δb (see FIG. 6) in the up and down direction. Since a width Lbh between the intermediate portions 35a, 35b of the bushing 8 is greater than the distance Lh between the flat plate portions of the bracket 6 (Lbh>Lh), the bushing 8 has interferences Δc, Δd in the front and rear direction. In the present embodiment, each of the interferences Δc, Δd in the front and rear direction is less than each of the interferences Δa, Δb in the up and down direction.

A relative positional relationship between the bushing 8 and the bracket 6 is determined in advance in a state in which the bushing 8 is mounted on the vehicle-body-side component 4 by the bracket 6. In the present embodiment, the width decreasing portions 36a, 36b and the recessed portions 38a, 38b of the bushing 8 are respectively opposed to the inwardly inclined portions 24a, 24b and the inwardly protruding portions 26a, 26b of the bracket 6. Furthermore, the intermediate portions 35a, 35b of the bushing 8 are respectively opposed to the flat plate portions 21a, 21b of the bracket 6.

Figure 5:
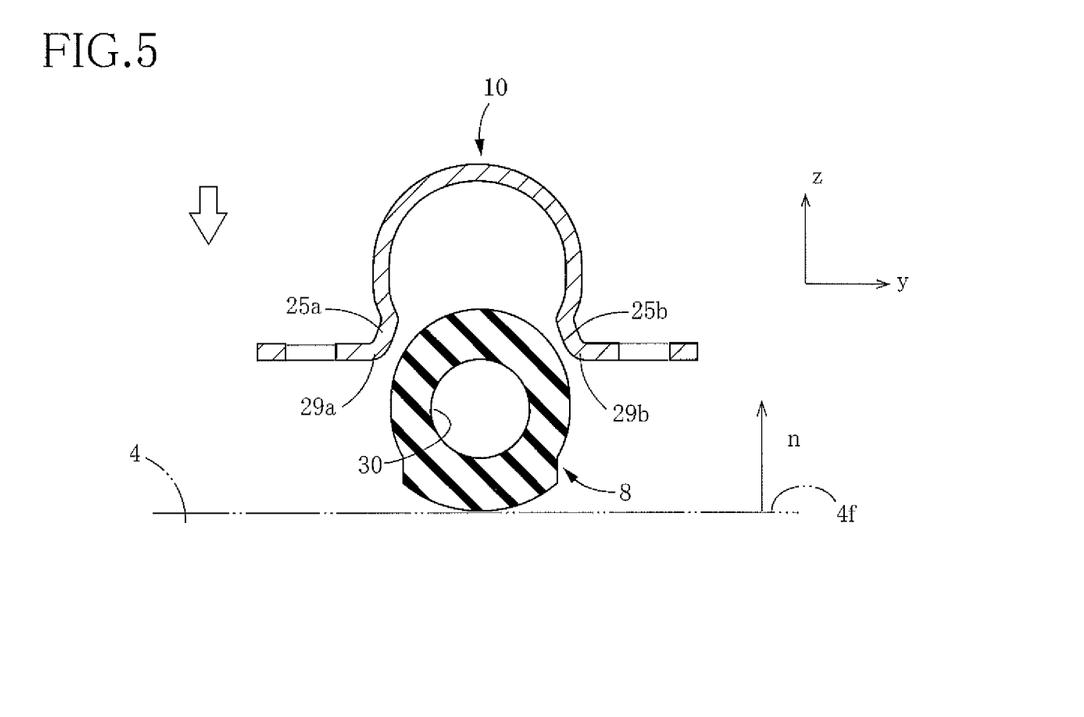
FIG. 5 is a view for explaining mounting of the stabilizer bar in the bar mounting device.

There will be next explained the case where the stabilizer bar 2 is mounted onto the vehicle-body-side component 4 by the bar mounting device 1. The stabilizer bar 2 is in advance inserted in the through hole 30 of the bushing 8 and bonded to the bushing 8. As illustrated in FIG. 5, the bracket 6 is brought closer to the vehicle-body-side component 4 toward the bushing 8 to which the stabilizer bar 2 is bonded, along the arrow in FIG. 5, i.e., in a direction substantially parallel to the normal line n to the mounting surface 4f of the vehicle-body-side component 4, and then the bushing 8 is inserted into the recessed portion 10 of the bracket 6. Since an opening of the recessed portion 10 of the bracket 6 is gradually broaden or tapered, the bushing 8 can be easily inserted into the recessed portion 10. As illustrated in FIG. 1, the flange portions 12a, 12b of the bracket 6 are then secured to the vehicle-body-side component 4 by the fastening device 16. The bushing 8 is elastically deformed or compressed by, e.g., the bracket 6 and the vehicle-body-side component 4.

The bushing 8 has the interferences not only in the up and down direction but also in the front and rear direction, thereby applying surface pressures to the stabilizer bar 2 not only in the up and down direction but also in the front and rear direction. Also, the narrowed portions 28 of the bracket 6 compress the bushing 8 toward the stabilizer bar 2, in other words, in directions indicated by arrows F1, F2 in FIG. 6, thereby applying surface pressures to a portion R of a lower portion of the stabilizer bar 2. As a result, greater surface pressures can be applied to the lower portion of the stabilizer bar 2, and the surface pressures can be uniformly applied to the stabilizer bar 2, thereby preventing reduction in lowering of adhesiveness of the stabilizer bar 2 and the bushing 8.

The bushing 8 is mounted, with its major axis direction coinciding with the up and down direction. Thus, the volume of the bushing 8 in the up and down direction is greater than that in the front and rear direction, allowing the bushing 8 to reliably support the stabilizer bar 2 in the up and down direction.

The bottom surface 39 of the bushing 8 is curved, and the narrow portion 32 is provided so as to be opposed to the vehicle-body-side component 4. Thus, the bushing 8 is accommodatable in a space formed in the bracket 6 even when the bushing 8 is elastically deformed by the vehicle-body-side component 4 and widen in the widthwise direction (i.e., the front and rear direction).

The intermediate portions 35a, 35b of the bushing 8 are respectively opposed to the flat plate portions 21a, 21b of the bracket 6. Thus, the flat plate portions 21a, 21b can well compress the respective intermediate portions 35a, 35b, thereby well applying the surface pressures to the bushing 8 in the front and rear direction.

Incidentally, as in the bar mounting device disclosed in Patent Document 2, it is possible to provide a rigid component between the bushing and the vehicle-body-side component to uniform surface pressures acting on the stabilizer bar, which however causes another problem of increase in the number of components. In the bar mounting device 1 according to the present embodiment, in contrast, the narrowed portion 28 is provided in the bracket 6. This construction can uniformly apply the surface pressures to the stabilizer bar 2 without increase in the number of components. Patent Document 1 has no suggestion for providing the narrowed portion 28 in the bracket 6.

It is noted that the bar mounting device 1 according to the present embodiment can be used also in a construction in which the stabilizer bar 2 is not bonded to the bushing 8. Even in this construction, the surface pressures can be uniformly applied to the stabilizer bar 2, thereby well preventing the through hole 30 of the bushing 8 from being opened.

The shape of the bracket 6 is not limited to its shape in the above-described embodiment. For example, the flat plate portions 21a, 21b and the outwardly inclined portions 25a, 25b are not essential. Portions of the bracket 6 between the intermediate portions 22a, 22b and the respective inwardly protruding portions 26a, 26b may have a shape which is formed by bending the pair of opposed portions 20a, 20b in a direction parallel to the flange portions 12a, 12b. In the state in which the stabilizer bar 2 is mounted on the vehicle-body-side component 4 by the bar mounting device 1, the inwardly protruding portions 26 and the narrowed portion 28 may be provided below a line of intersection of each of the pair of opposed portions 20a, 20b and the lower tangent plane s to the stabilizer bar 2 and may be provided between (i) the line of intersection of each of the pair of opposed portions 20a, 20b and the plane d containing the diameter of the stabilizer bar 2 and (ii) the line of intersection each of the pair of opposed portions 20a, 20b and the lower tangent plane s, for example.

The shape of the bushing 8 is not limited to its shape in the above-described embodiment. For example, the bottom surface 39 may be a flat surface. Also, each of the intermediate portions 35a, 35b may be a flat plate portion. The bar mounting device 1 may be used also in the case where the stabilizer bar 2 is mounted on the vehicle-body-side component 4 for which the normal line n extends in the front and rear direction of the vehicle or in the case where the stabilizer bar 2 is mounted on the vehicle-body-side component 4 for which the normal line n is inclined with respect to the up and down direction and the front and rear direction.

Second Embodiment

Figure 7:
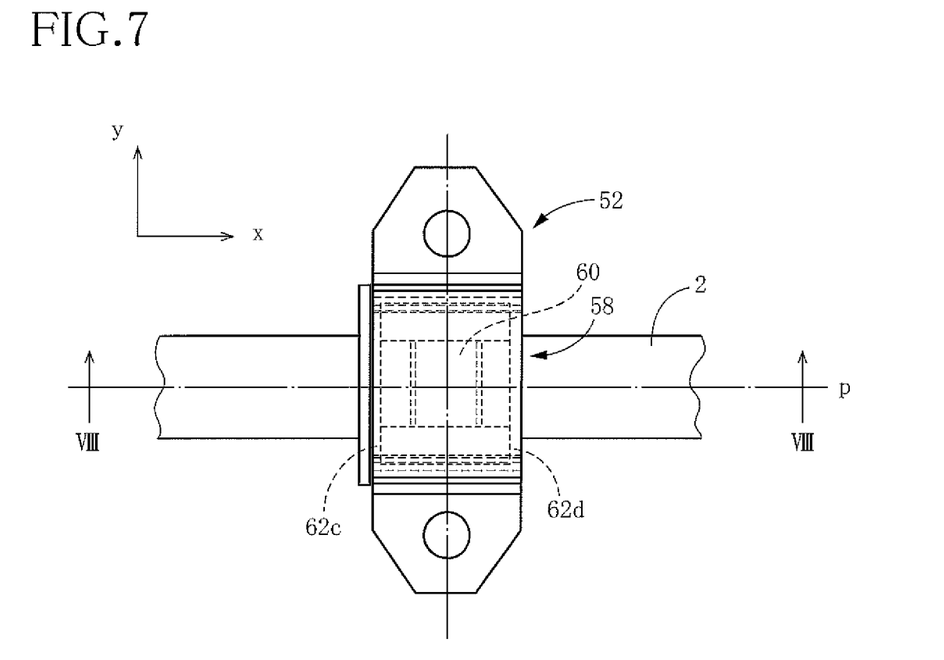
FIG. 7 is a plan view of a bar mounting device according to a bracket according to a second embodiment.
Figure 8:
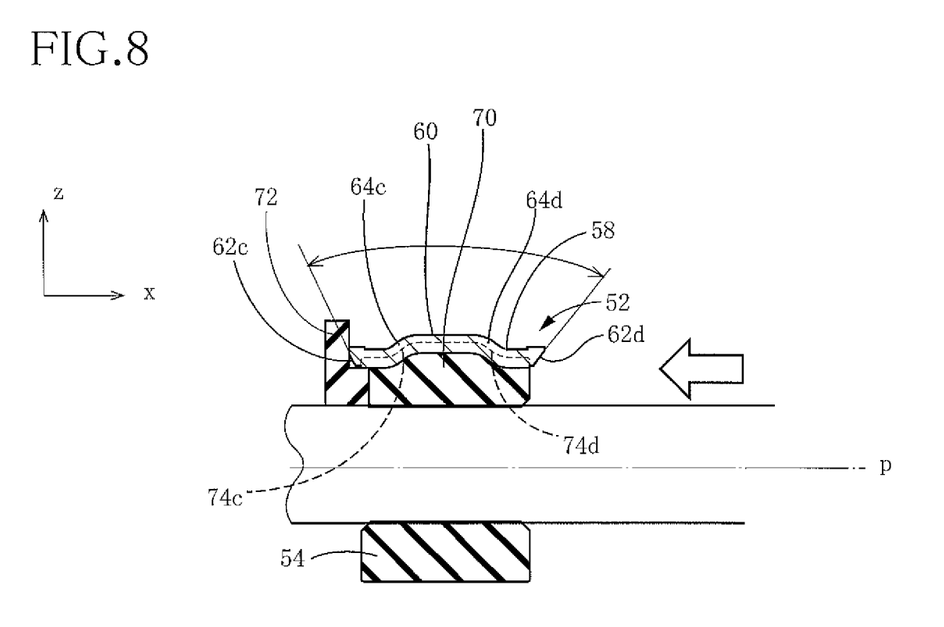
FIG. 8 is a cross-sectional view of the bar mounting device (FIG. 8 is a cross-sectional view taken along line VIII-VIII in FIG. 7)

FIGS. 7 and 8 illustrate a bar mounting device including a bracket 52 according to a second embodiment and a bushing 54. The bracket 52 has a generally "Ω" shape in cross section like the bracket 6 according to the first embodiment. The bracket 52 differs from the bracket 6 in that a protruding portion 60 is formed near a top portion of a recessed portion 58 and that opposite end surfaces of the recessed portion 58 in the axial direction are inclined surfaces 62c, 62d each extending outward. As illustrated in FIG. 8, opposite end portions of the protruding portion 60 in the axial direction are R-shaped portions 64c, 64d.

The bushing 54 has a cross-sectional shape which is generally formed by cutting out a portion of an oval shape like the bushing 8 in the first embodiment. The bushing 54 differs from the bushing 8 in that a protruding portion 70 is formed near a top portion of the bushing 54 and that the bushing 54 is provided with a stopper 72 protruding from one end portion of the bushing 54 in the axial direction. As illustrated in FIG. 7, opposite end portions of the protruding portion 70 in the axial direction are R-shaped portions 74c, 74d.

When mounting the stabilizer bar 2 onto the vehicle-body-side component, the bracket 52 is mounted on the stabilizer bar 2 substantially in the up and down direction (Z) such that the recessed portion 58 straddles a portion of the stabilizer bar 2 to which the bushing 54 is not bonded. In this state, the stabilizer bar 2 is then moved in the axial direction (X) indicated by arrow in FIG. 8. Since the inclined surfaces 62c, 62d extending outward are provided as the opposite end surfaces of the bracket 52 in the axial direction, the bushing 54 is easily inserted into the bracket 52 and not easily damaged when mounting the bracket 52 onto the stabilizer bar 2. The bracket 52 is then moved in the axial direction to a position at which the bracket 52 covers an outer surface of the bushing 54. The movement of the bracket 52 and the bushing 54 relative to each other in the axial direction is easy because the R-shaped portions 64c, 64d are provided at steps of the protruding portion 60 of the bracket 52, and the R-shaped portions 74c, 74d are provided at steps of the protruding portion 70 of the bushing 54. The bracket 52 is moved until an end face of the bracket 52 in the axial direction (i.e., the inclined surface 62c) is brought into contact with the stopper 72 provided on the bushing 54. This construction allows the bracket 52 to be accurately positioned relative to the bushing 54. Since the bracket 52 has the narrowed portion 28, it is difficult in some cases for the bushing 54 to be inserted into the recessed portion 58 in the up and down direction, but the bushing 54 may be easily inserted into the recessed portion 58 in the axial direction.

While the embodiments have been described above, it is to be understood that the disclosure is not limited to the details of the illustrated embodiments, but may be embodied with various changes and modifications, which may occur to those skilled in the art, without departing from the spirit and scope of the disclosure.

What is claimed is:

1. A stabilizer-bar mounting device, comprising:
   a bushing; and
   a bracket for holding a stabilizer bar on a vehicle-body-side component via the bushing, the bracket comprising:
   a recessed portion configured to hold the bushing; and
   a pair of flange portions respectively located on opposite sides of the recessed portion,
   wherein the recessed portion comprises a pair of opposed portions opposed to each other,
   wherein the opposed portions comprise an intermediate portion and a portion nearer to the pair of flange portions than the intermediate portion, and a distance between the opposed portions is less at the portion nearer to the pair of flange portions than at the intermediate portion,
   wherein the bushing has a cross-sectional shape with a length of the bushing being greater than a height from the pair of flange portions of the bracket to a top portion of the recessed portion, such that, when the bushing is mounted in the bracket, an outer surface of the bushing is in contact with an inner surface of the recessed portion of the bracket and a portion of the outer surface of the bushing extends from the recessed portion beyond the pair of flange portions,
   wherein the portion of the outer surface of the bushing that extends beyond the pair of flange portions is curved in a transverse direction that extends between the pair of flange portions and is narrower than a transverse width at a center of the bushing, and
   wherein the portion of the outer surface of the bushing that extends beyond the pair of flange portions is configured to be in contact with the vehicle-body-side component when the stabilizer bar is mounted on the vehicle-body-side component and is configured to be compressed by the vehicle-body-side component to a flattened configuration that flares outward in the transverse direction.

2. The stabilizer-bar mounting device according to claim 1,
   wherein the opposed portions respectively comprise outwardly inclined portions that are nearer to the pair of flange portions than the intermediate portion, and a distance between the outwardly inclined portions while traveling along a length of each of the outwardly inclined portions increases with decrease in distance to the pair of flange portions, and
   wherein the pair of outwardly inclined portions respectively comprise a straight portion, and a distance between the straight portions continuously increases with a decrease in distance to the pair of flange portions.

3. The stabilizer-bar mounting device according to claim 1, wherein the bracket has a substantially Ω shape in cross section.

4. The stabilizer-bar mounting device according to claim 3, wherein a portion of the recessed portion between the top portion and the intermediate portion of the recessed portion has a substantially arc shape in cross section.

5. The stabilizer-bar mounting device according to claim 3, wherein the intermediate portion of the recessed portion comprises a portion at which a distance between the opposed portions while traveling along a length of each of the opposed portions is constant.

6. A stabilizer-bar mounting device, comprising:
a bushing; and
a bracket for holding a stabilizer bar on a vehicle-body-side component via the bushing, the bracket comprising:
a recessed portion configured to hold the bushing; and
a pair of flange portions respectively located on opposite sides of the recessed portion,
wherein the recessed portion comprises a pair of opposed portions opposed to each other,
wherein the opposed portions comprise an intermediate portion and a portion nearer to the pair of flange portions than the intermediate portion, and a distance between the opposed portions is less at the portion nearer to the pair of flange portions than at the intermediate portion,
wherein the bushing comprises a pair of recessed portions corresponding to a pair of inner protruding portions of the bracket, and a distance between the inner protruding portions is less than the distance between the opposed portions at the intermediate portion,
wherein the bushing has a cross-sectional shape with a length of the bushing being greater than a height from the flange portions of the bracket to a top portion of the recessed portion, such that, when the bushing is mounted in the bracket, an outer surface of the bushing is in contact with an inner surface of the recessed portion of the bracket and a portion of the outer surface of the bushing extends from the recessed portion beyond the pair of flange portions,
wherein the portion of the outer surface of the bushing that extends beyond the pair of flange portions is curved in a transverse direction that extends between the pair of flange portions and is narrower than a transverse width at a center of the bushing, and
wherein the portion of the outer surface of the bushing that extends beyond the pair of flange portions is configured to be in contact with the vehicle-body-side component when the stabilizer bar is mounted on the vehicle-body-side component and is compressed by the vehicle-body-side component to a flattened configuration that flares outward in the transverse direction.

7. The stabilizer-bar mounting device according to claim 6, wherein each of the recessed portions of the bushing is located on a line of intersection of (i) a corresponding one of a pair of side surfaces of the bushing and (ii) a tangent plane to a through hole formed in the bushing.

8. The stabilizer-bar mounting device according to claim 6, wherein the bracket has a substantially Ω shape in cross section.

9. The stabilizer-bar mounting device according to claim 8, wherein a portion of the recessed portion of the bracket between the top portion and the intermediate portion of the recessed portion of the bracket has a substantially arc shape in cross section.

10. The stabilizer-bar mounting device according to claim 1,
wherein each of the pair of flange portions has a hole for receiving a fastening device for mounting the bracket to the vehicle-body-side component.

11. The stabilizer-bar mounting device according to claim 1,
wherein the bushing is in contact with the top portion of the recessed portion of the bracket, the top portion being opposite to the pair of flange portions.

* * * * *